United States Patent [19]

Small

[11] Patent Number: 4,467,987
[45] Date of Patent: Aug. 28, 1984

[54] QUARTER TURN FASTENER

[75] Inventor: Edith M. Small, New Lenox, Ill.

[73] Assignee: Illinois Tool Works Inc., Chicago, Ill.

[21] Appl. No.: 345,947

[22] Filed: Feb. 4, 1982

[51] Int. Cl.³ ............................................. E04G 5/06
[52] U.S. Cl. ................................. 248/68.1; 411/549
[58] Field of Search .................. 248/68 R, 73, 74 A, 248/74 B, 239; 24/221 R, 221 A, 221 K

[56] References Cited

U.S. PATENT DOCUMENTS

| | | | |
|---|---|---|---|
| 3,179,367 | 4/1965 | Rapata | 248/239 |
| 3,443,783 | 5/1969 | Fisher | 248/239 |
| 4,131,258 | 12/1978 | Okuda et al. | 24/221 R |
| 4,143,557 | 3/1979 | Eberhardt | 248/71 |
| 4,194,429 | 3/1980 | Wright | 24/221 R |
| 4,247,219 | 1/1981 | Ausprung | 24/221 R |
| 4,295,618 | 10/1981 | Morota et al. | 248/68 R |

FOREIGN PATENT DOCUMENTS 1272412  7/1968  Fed. Rep. of Germany ... 248/74 A

Primary Examiner—William H. Schultz
Assistant Examiner—Ramon O. Ramirez
Attorney, Agent, or Firm—Thomas W. Buckman; John P. O'Brien

[57] ABSTRACT

An integral quarter turn plastic fastener is provided for insertion beneath the floor of an automobile. Retainers are provided on the fastener for receipt and retention of fluid lines, such as fuel lines and brake lines, of different sizes. The fastener can be installed in only one position to insure proper orientation of the retainers.

7 Claims, 7 Drawing Figures

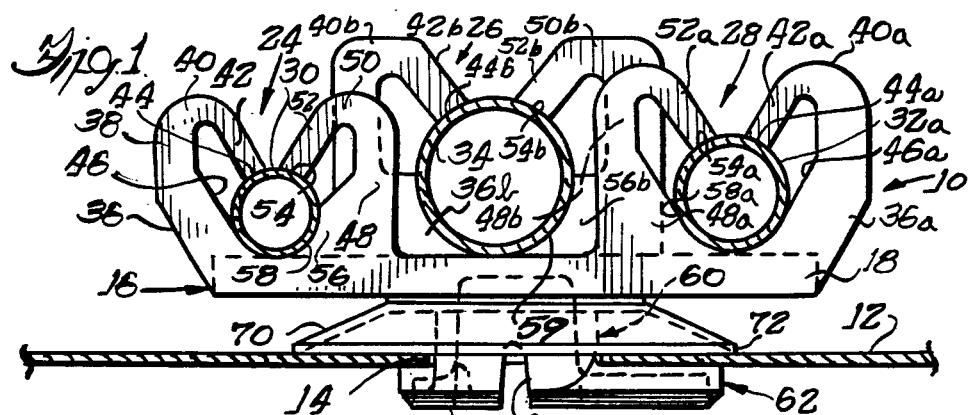
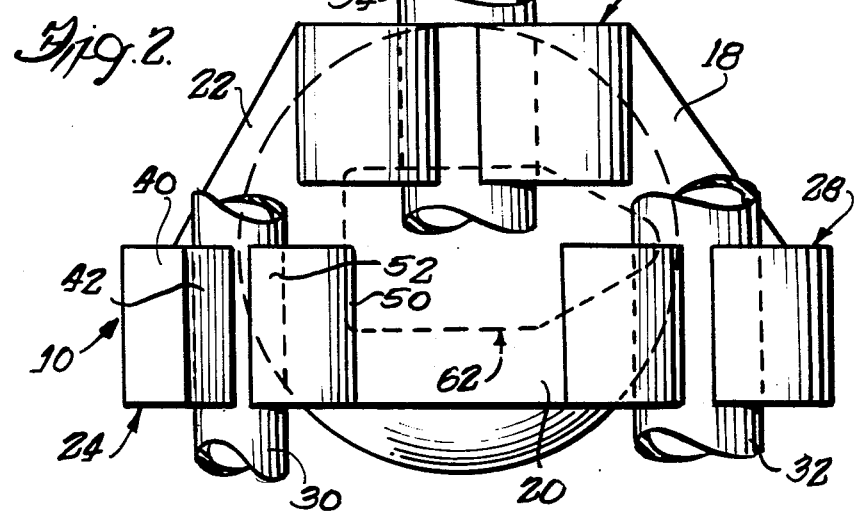
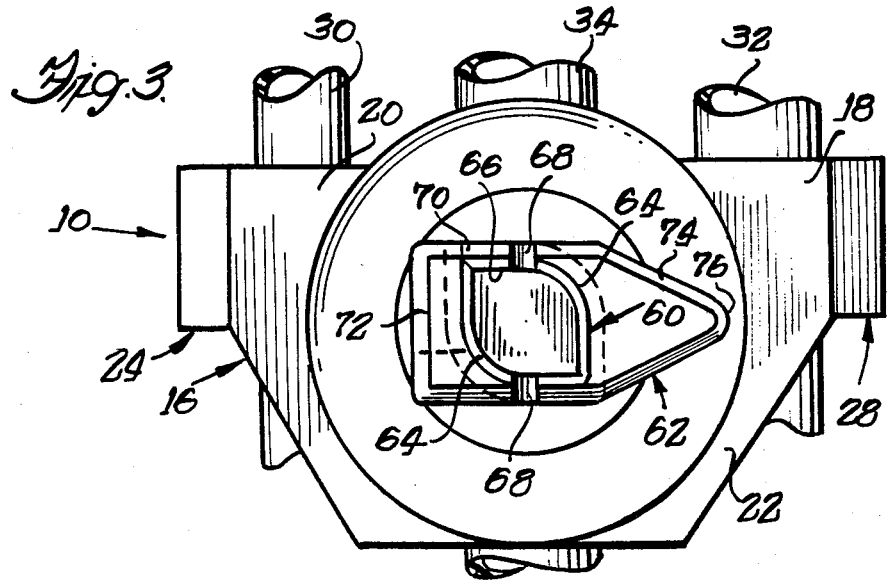

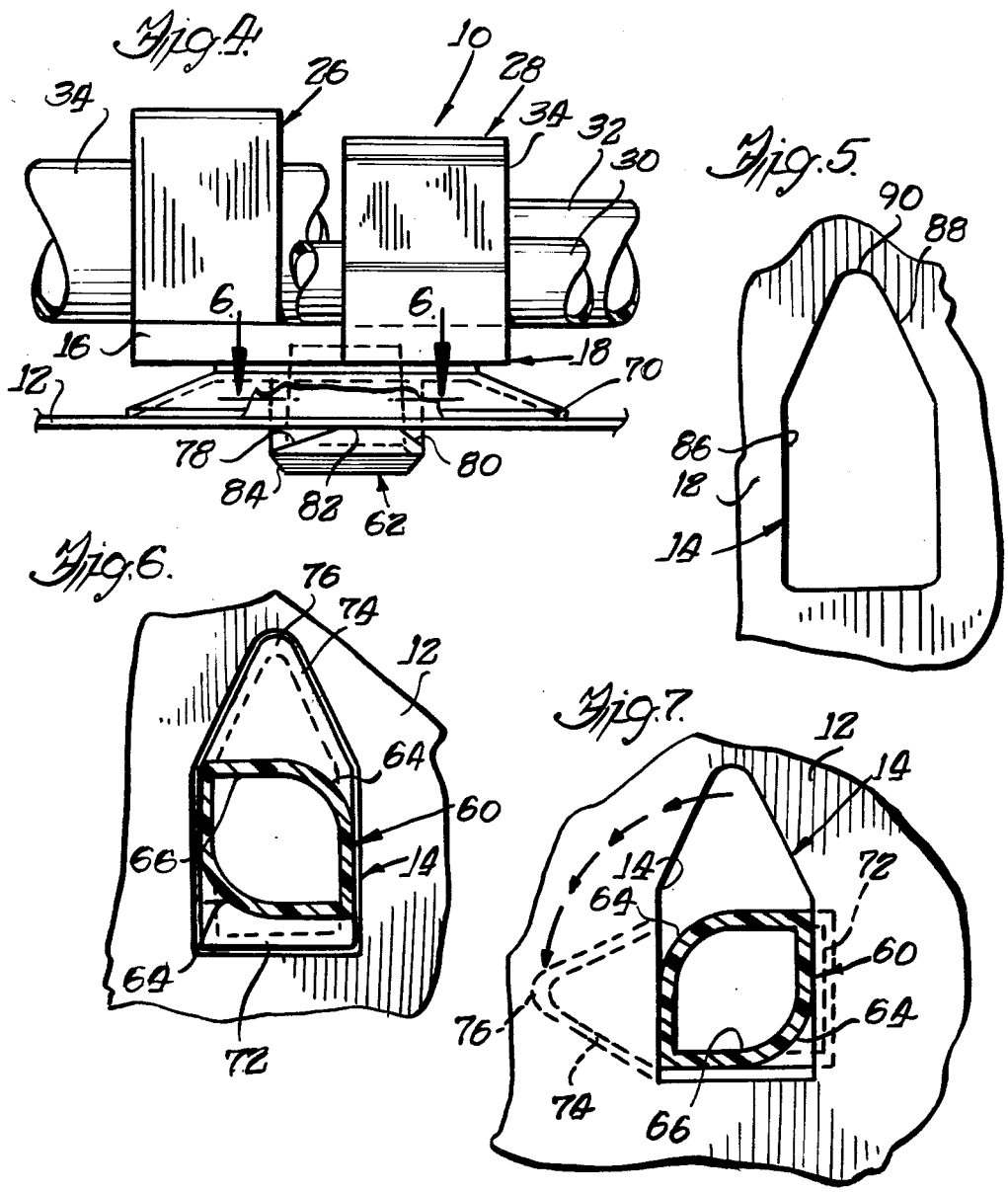

QUARTER TURN FASTENER

BACKGROUND OF THE INVENTION

In the construction of automobiles it is common practice to place the engine at the front of the automobile with the tank for gasoline or other fuel at the rear. This requires at least one fuel line to lead from the fuel tank to the vicinity of the engine. In accordance with present day practices and anti-pollution controls it is common practice to return surplus fuel from the engine area to the fuel tank. This requires an additional fuel line. Furthermore, brake lines lead from the master cylinder, generally on or adjacent to the fire wall at the front portion of the automobile to the four wheels, and for present considerations, particularly to the rear wheels. Thus, there are many lines, both fuel lines and brake lines, and perhaps others leading beneath the floor of a modern automobile relatively from the front to the rear thereof. Some means must be provided for supporting such fluid lines.

The lines in question are generally made of metallic tubing, although they may have flexible portions of either end thereof. Emphasis on costs in the production of automobiles limits the amount of hand labor that can be utilized in securing such fluid lines in position beneath the floor of an automobile.

Plastic fasteners which are insertable through a shaped aperture in a mounting plate are known in the art, and are secured by a simple quarter turn of the fastener. Such fasteners are shown in the prior patent art such as in U.S. Pat. Nos. 2,940,558, 3,179,367, and 3,182,770. If principals of such fasteners or supports could be used for supporting fuel and brake lines there could be a material saving in labor in the assembly of an automobile.

OBJECTS AND BRIEF SUMMARY OF THE PRESENT INVENTION

It is an object of the present invention to provide a fastener or retainer for supporting fluid lines such as fuel and brake lines beneath the floor pan of an automobile, which fastener utilizes the principals of quarter turn fasteners.

It is further an object of the present invention to provide such a fastener which is capable of being installed in only one position, whereby to provide accurate positioning of a support means for tubing of different sizes.

It is further an object of the present invention to provide a quarter turn fastener of the type heretofore noted for supporting fluid lines beneath the floor pan of an automobile, which fastener provides the sealing of the aperture in which it is mounted against the entrance of water, etc.

In achieving the foregoing and other objects of the present invention a quarter turn fastener is provided which is shaped for insertion in only one possible position. The fastener is provided with a plurality of fluid line retainers, preferably of different sizes and disposed in proper relative position by the single position orientation of the clip relative to the supporting panel. Each of the fluid line retainers of the fastener comprises a trough or channel having overlying reentrant flanges forming, in effect, an open bottomed channel through which the respective fluid line is pressed diametrically of itself, the flanges flexing sufficiently to permit the line to move into the receiving channel with the flanges then resiliently snapping back above the fluid line in firm, resilient engagement therewith to hold the line in the respective channel.

The entire retainer or fastener is molded of resilient plastic which is weather resistant. It is provided with cam surfaces and slots to permit adaptation to panels of different thicknesses, and it further is provided with a structure for sealing about the hole in which the locking means of the fastener is inserted to prevent entrance of water, etc. through said hole.

THE DRAWINGS

The present invention will best be understood with reference to the following specification when taken in connection with the accompanying drawings wherein:

FIG. 1 is a side view of a fastener or retainer constructed in accordance with the present invention, the panel with which the fastener is associated being shown in cross-section as are the fluid lines mounted by the fastener;

FIG. 2 is a top view of the fastener of FIG. 1;

FIG. 3 is a bottom view thereof;

FIG. 4 is a side view taken at right angles to FIG. 1;

FIG. 5 is a plan view showing the aperture in which the fastener is inserted;

FIG. 6 is a cross-sectional view taken substantially along the line 66 in FIG. 4 showing initial insertion of the fastener through the aperture in the panel; and, FIG. 7 is a view similar to FIG. 6 after 90° turning of the fastener.

DETAILED DESCRIPTION OF THE ILLUSTRATED EMBODIMENT

Referring now in greater particularity to the drawings, and first to FIGS. 1–4, there is seen a quarter turn fastener 10 constructed in accordance with the principals of the present invention and associated with a panel 12, a portion of the fastener being inserted through an aperture 14 in the panel as will be brought out hereinafter. The fastener is shown in an upright position overlying the panel 12, and there is no reason that it cannot be used in this position. However, for use in carrying fuel lines and brake lines in an automobile it would normally be inverted 180° from the position shown in FIGS. 1 and 4 with the main body of the fastener underlying the panel 12, which would be the floor pan of an automobile.

The fastener 10 comprises a body 16 having a flat floor 18 which in FIGS. 2 and 3 will be seen to have a relatively wide first portion 20 integrally formed with a second portion 22 tapering from the maximum width and generally in the form of a regular trapezoid.

Three fluid line retaining fittings 24, 26, and 28 are integrally formed on the floor 18 and all are of similar configuration, but of different sizes. The fitting 24 is intended to receive a relatively small fluid line 30, the fitting 28 is sized to retain an intermediate size fluid line 32, and the fitting 26 is sized to retain a relatively large fluid line 34. As best may be seen in FIGS. 2 and 4 the fittings 24 and 28 are parallel to one another and at opposite extremities of the relatively wide rectangular portion 20 of the floor 18, while the fitting 26 is located centrally of the fittings 24 and 28, but axially offset therefrom at the far edge of the trapezoidal floor section 22.

The fitting 24 comprises a left wall (considering the parts are viewed in FIG. 1) extending diagonally upwardly and outwardly from the outer left edge of the floor 18, and having an upper vertical wall portion 38. The vertical wall portion continues into a reentrant portion 40 having a flange 42 extending downwardly and to the right to a terminating edge 44 which may be of concave-cylindrical shape. This edge bears against a portion of the surface of the fluid line 30. The wall 36 is provided with an inner slanting surface 46 to aid in centering the line 30.

The fitting 24 also includes a right wall 48 extending upwardly to a reentrant portion 50 leading to a flange 52 extending downwardly and to the left at an oblique position and having a lower edge 54 which may be concave-cylindrical to bear against the surface of the line 30. The wall 48 is provided with an inward filler 56 providing an oblique surface 58 generally complimentary to the oblique surface 46 to effect centering of the fluid line 30. The filler 56 and the bottom portion of the inclined wall 36 coact with the floor 18 to provide a lower nearly semicircular portion 58 which receives the fluid line 30. The terminating edges of the flanges 42 and 52 are spaced apart rather considerably less than the diameter of the fluid line 30. The walls 42 and 52 in effect form an open bottomed V. Thus, the line 30 may be pressed radially of itself between the flanges 42 and 52 which resiliently is spread apart due to the inherent characteristics of the plastic material. As the fluid line 30 passes below the lower ends 44 and 54 of the respective flanges, and is resiliently indented slightly against the floor 18 in the semicircular recess 58 the flanges resiliently move back to their initial positions, thereby permanently retaining the fluid line in the semicircular bed 58 and restrained by the ends 44 and 54 of the flanges 42 and 52.

The fluid line retaining fitting 28 is identical with the fitting 24, except that it is slightly larger, and is disposed in mirror-image relation to the fitting 24 on the opposite edge of the rectangular portion 20 of the floor 18. Like parts are identified by similar numerals with the addition of the suffix a, whereby further description is unnecessary.

The larger fluid line retaining fitting 26 is similar to the fittings 24 and 28, but with some specific differences. Like parts are again identified by similar numerals, this time with the addition of the suffix b. Distinctions reside in the fact that the left wall 42b extends straight down to the floor 18, the reentrant portions 40b and 50b have extended horizontal portions, and a complete semicircular line receiving portion 59 is defined by the filler 56b and a like filler 36b on the other side.

The three fittings 24, 26 and 28 thus are similar, all being formed integrally with the floor 18 and being designed to receive fluid lines of somewhat different sizes. Due to the different sizes it is important that the fastener be installed in proper position.

In addition to the parts heretofore shown and described the fastener includes a neck 60 and a head 62. The neck 60 is generally square in configuration (see FIGS. 3, 6 and 7) but has two rounded off corners 64 opposite to one another. This permits turning of the fastener in only one direction as will be brought out shortly hereinafter. The neck is hollow as is indicated at 66, and there are two slots 68 on opposite sides of the neck extending longitudinally thereof, and through the head 62. A generally concave-convex or umbrella type shield 70 surrounds the neck, and is joined to the floor 18, opening away from the floor, whereby the peripheral edge 72 thereof presses against the panel when the fastener is installed.

The head 62 comprises a rectangular portion 70 having a heel 72 extending beyond the neck, and also having an elongated tapered nose 74 of generally triangular configuration, but with rounded end 76 extending oppositely of the heel 72. As may be seen in FIG. 4 the surface of the head confronting the body has cam surfaces 78 and 80 leading to a flat bearing surface 82, the latter bearing against the panel 12. The cam surfaces facilitate insertion of the fastener and with the slots 68 permit taking up various thicknesses of panel 12. The umbrella type shield 70 also has some efficacy in accommodating panels of different thicknesses.

The opposite side or end of the head is also provided with tapered surfaces 84 to facilitate passage of the head through the aperture in the panel 12. This aperture 14, previously mentioned, as readily may be seen in FIGS. 5–7 is complimentary in shape to the head, but slightly larger. Specifically, the aperture includes an elongated rectangular section 86, and a tapered nose 88 having a rounded extremity 90. The head thus is installed through the aperture 14 by inserting it as shown in FIG. 6. The fastener is then turned 90° as indicated in FIG. 7 where it frictionally locks in place. Subsequent installation of the fluid lines in the retainers further restrains the fastener against retrograde rotary motion. As will be apparent the fastener can be installed in only one position, since the head fits through the aperture in only one direction, and since the rounded surfaces 64 of the neck 60 permit rotation of the fastener one quarter turn in only one direction.

The quarter turn fastener which has now been disclosed is readily molded as a single, integral piece from known plastic material which imparts the necessary resilience and resistance to weathering and physical stress. The umbrella type shield 70 seals the hole in the panel through which the fastener is inserted, and prevents entrance of moisture, water, etc. The specific example of the invention is illustrated as having three different fluid line retainers of three different sizes. There could be more or less retainers, and the fluid lines could be of significantly differently sizes than shown, and some of them could be of the same size as others. It will be understood that the specific example is for illustrative purposes only, and various changes will no doubt occur to those skilled in the art, and will be understood as forming a part of the present invention insofar as they fall within the spirit and scope of the appended claims.

The invention is claimed as follows:

1. The combination of a rotatably blade installable integral fastener for support of at least one fluid line retaining means thereon and an aperture formed in a panel, said fastener including a restricted neck adjoining a body means and adapted to extend through said aperture, an enlargement on said neck engaging the remote side of said panel to hold said fastener in the installed position on said panel, said neck and said aperture being shaped to permit limited rotatable movement of said fastener during installation to position said retaining means in a predetermined manner, and panel engaging means for accommodating panels of different thicknesses comprising cam surfaces, said fastener being constructed of resilient material.

2. A fastener as set forth in claim 1 and further including slot means enhancing yieldability of said resilient fastener.

3. The combination of a fastener for installation in an aperture of a panel where said aperture comprises a rectangular portion and a contiguous nose portion, and where said fastener comprises body means having fluid line retaining means, a restricted neck adjoining said body means and an enlargement extending from said neck for engaging the remote side of said panel to hold said fastener in an installed position on said panel, the cross section of said enlargement having the same shape as said aperture with slightly smaller size, said neck including means for permitting insertion in only one direction during installation to angularly position said retaining means in a predetermined orientation relative to said panel.

4. The combination of claim 3, wherein the neck comprises a lozenge-shaped cross sectional area being defined by arcuate segments concentric with the center point of said rectangular portion of said aperture and right-angled abutment parts extending from the ends of said arcuate portions, the distance between diagonally opposite segments of said abutment parts being slightly less than the distance between the two parallel sides of said rectangular portion, whereby when said fastener is rotated in said one direction said diagonally opposite segments of said abutment parts engage against the sides of said two parallel sides of said rectangular portion.

5. The combination of claim 3, wherein said enlargement is constructed of resilient material includes cam surfaces for facilitating insertion of said fastener into said aperture.

6. The combination of claim 5, wherein said resilient enlargement includes slot means to enhance its yieldability.

7. The combination of claim 3 further including shielding means surrounding said neck and engaging said panel to seal said aperture.

* * * * *